(12) United States Patent
Brousseau et al.

(10) Patent No.: US 9,624,831 B2
(45) Date of Patent: Apr. 18, 2017

(54) SYSTEM AND METHOD FOR OPERATING A PRECOOLER IN AN AIRCRAFT

(75) Inventors: Jean Brousseau, Pierrefonds (CA); Sigit Afrianto, Pierrefonds (CA); Remi Hamel, Laval (CA); Valerie Desilets, Vaudreuil (CA)

(73) Assignee: BOMBARDIER INC., Dorval, Quebec (CA)

( * ) Notice: Subject to any disclaimer, the term of this patent is extended or adjusted under 35 U.S.C. 154(b) by 684 days.

(21) Appl. No.: 14/004,974

(22) PCT Filed: Mar. 16, 2012

(86) PCT No.: PCT/US2012/029368
§ 371 (c)(1),
(2), (4) Date: Sep. 13, 2013

(87) PCT Pub. No.: WO2012/125895
PCT Pub. Date: Sep. 20, 2012

(65) Prior Publication Data
US 2014/0000279 A1   Jan. 2, 2014

Related U.S. Application Data (60) Provisional application No. 61/453,657, filed on Mar. 17, 2011.

(51) Int. Cl.
*F02C 7/00*    (2006.01)
*B64D 13/08*  (2006.01)
(Continued)

(52) U.S. Cl.
CPC ............ *F02C 7/00* (2013.01); *B64D 13/08* (2013.01); *B64D 33/10* (2013.01); *F01D 25/02* (2013.01);
(Continued)

(58) Field of Classification Search
CPC .... F02C 6/08; F02C 7/00; F02C 7/047; F02C 7/057; F02C 7/12; F02C 7/14; F02C 7/18;
(Continued)

(56) References Cited

U.S. PATENT DOCUMENTS 3,981,466 A * 9/1976 Shah .................. B64D 15/02
                                                       165/42
5,137,230 A   8/1992 Coffinberry
(Continued)

FOREIGN PATENT DOCUMENTS

EP   0953506 A2   11/1999
FR   2920146      2/2009

OTHER PUBLICATIONS

International Search Report, mailed Jun. 19, 2012, for International Patent Application No. PCT/US2012/029368.

*Primary Examiner* — Arun Goyal
(74) *Attorney, Agent, or Firm* — Karceski IP Law, PLLC (57) ABSTRACT

An aircraft engine includes a precooler disposed within a nacelle. The precooler defines an ambient air passage and a bleed air passage. Air passes through the precooler from an ambient air inlet to an ambient air outlet. Bleed air passes through the precooler from a bleed air inlet to a bleed air outlet. Heat is transferred between the air and the bleed air via heat exchange within the precooler. At least one pressure relief door disposed proximate to the air outlet of the engine. A controller is operatively connected to the pressure relief door. The controller at least opens the pressure relief door based on a demand for increased flow of air through the ambient air passage.

20 Claims, 7 Drawing Sheets

(51) Int. Cl.
    *B64D 33/10*     (2006.01)
    *F01D 25/02*     (2006.01)
    *F01D 25/14*     (2006.01)
    *F02C 7/14*     (2006.01)
    *F02C 9/18*     (2006.01)
    *F02K 1/82*     (2006.01)
    *F02K 3/06*     (2006.01)
    *F02K 3/075*     (2006.01)
    *F02K 3/115*     (2006.01)
    *F02C 6/08*     (2006.01)
    *B64D 13/06*     (2006.01)

(52) U.S. Cl.
    CPC ............... *F01D 25/14* (2013.01); *F02C 6/08* (2013.01); *F02C 7/14* (2013.01); *F02C 9/18* (2013.01); *F02K 1/822* (2013.01); *F02K 3/06* (2013.01); *F02K 3/075* (2013.01); *F02K 3/115* (2013.01); *B64D 2013/0618* (2013.01); *Y02T 50/44* (2013.01); *Y02T 50/56* (2013.01); *Y02T 50/675* (2013.01)

(58) Field of Classification Search
    CPC .. F02C 7/185; F02C 9/18; F01D 25/02; F01D 25/08; F01D 25/012; F02K 3/075; F02K 3/115; F12K 3/115; B64D 13/08
    See application file for complete search history.

(56) References Cited

U.S. PATENT DOCUMENTS

| 7,727,057 | B2* | 6/2010 | Beier | ............... | B64D 13/00 |
|---|---|---|---|---|---|
| | | | | | 165/235 |
| 7,886,520 | B2* | 2/2011 | Stretton | ............... | F01D 17/105 |
| | | | | | 239/265.17 |
| 7,926,261 | B2* | 4/2011 | Porte | ............... | B64D 13/06 |
| | | | | | 60/226.1 |
| 2007/0245739 | A1 | 10/2007 | Stretton et al. | | |
| 2008/0230651 | A1 | 9/2008 | Porte | | |
| 2009/0000305 | A1 | 1/2009 | Porte et al. | | |
| 2009/0007567 | A1 | 1/2009 | Porte et al. | | |
| 2009/0064658 | A1 | 3/2009 | Beutin et al. | | |
| 2010/0303616 | A1 | 12/2010 | Chir et al. | | |
| 2012/0185116 | A1 | 7/2012 | DeFrancesco | | |

* cited by examiner

SYSTEM AND METHOD FOR OPERATING A PRECOOLER IN AN AIRCRAFT

CROSS-REFERENCE TO RELATED APPLICATION(S)

This is a National Stage Entry into the United States Patent and Trademark Office from International PCT Patent Application No. PCT/US2012/029368, having an international filing date of Mar. 16, 2012, which relies for priority on U.S. Provisional Patent Application Ser. No. 61/453,657, filed on Mar. 17, 2011, the entire content of both of which are incorporated herein by reference.

FIELD OF THE INVENTION

The present invention relates to a system and method for operating a precooler in an aircraft. In particular, the present invention encompasses an apparatus and method for temporarily increasing the performance of a precooler in an aircraft.

DESCRIPTION OF RELATED ART

It is known to bleed hot, compressed air generated by an aircraft engine and provide that compressed air to equipment on the aircraft to perform certain onboard functions.

Specifically, it is known to siphon hot, compressed air (also referred to as "bleed air") from an aircraft engine so that the hot air may be used for aircraft functions outside of the aircraft engine. For example, the bleed air may be used in an aircraft's heating, ventilation, and air conditioning ("HVAC") system, the aircraft's anti-icing system, and the aircraft's fuel tank inerting system.

For an HVAC system installed in an aircraft with two engines, bleed air typically is siphoned from each engine and is sent to respective left and right side HVAC packs. The bleed air may be mixed with recirculated air in the cockpit and passenger cabin, where the bleed air conditions (i.e., heats) the cabin temperature and pressurizes the aircraft's interior.

For the wing anti-icing system, the hot bleed air may be used to heat areas of the aircraft which are prone to ice accumulation, such as along a wing's leading edge.

With respect to the aircraft's fuel tank inerting system, the bleed air may be used to reduce the oxygen content within the aircraft's fuel tank(s), thereby minimizing the possibility of fuel ignition within the fuel tank(s).

Depending upon the location where the bleed air is removed from an engine, the bleed air may exit the engine at temperatures up to 450° C. or more. Specifically, bleed air taken from a location near to the low pressure turbine may be at a temperature of about 120° C. Bleed air from a location near to the high pressure turbine may be at a temperature of about 500° C. Since the temperature of the bleed air may be too hot to directly circulate within the various systems of the aircraft, the hot bleed air may have to be cooled prior to use with one or more of the aircraft's other systems. As a result, it is known to provide a cooling device, commonly referred to as a precooler, to cool the hot bleed air down to temperature between about 200° C. to 232° C. depending on the usage. For engines such as turbofan engines, which use a turbine driven fan to provide thrust, a precooler is typically housed proximate to each engine, such as within the engine's nacelle or above the engine's pylon.

A precooler typically utilizes outside (or ambient) that is air drawn into by the fan to cool the hot, bleed air. Once inside the nacelle, the ambient air may be between 70° C., at low altitude on a hot day, and −20° C., at high altitude on a cold day. The precooler typically includes a cross flow air-to-air heat exchanger, which transfers heat energy from the streams of the hot, bleed air to the stream of cold, ambient air, while the two streams remain separated from one another. As should be apparent to those skilled in the art, a stream of cooled, bleed air exits from the precooler for use within the aircraft. Consequently, a stream of heated, ambient air also exits from the precooler. The heated, ambient air may be discharged into or around the engine nacelle or outside the aircraft, for example, above the pylon installation.

Precoolers are known in the art. Examples of known precoolers are described in the following references: U.S. Patent Application Publication No. 2008/0230651, U.S. Patent Application Publication No. 2009/0000305, and U.S. Patent Application Publication No. 2009/0007567. In addition, with respect to the art of turbofan aircraft engines, the following references describe engine precoolers: European Patent No. EP 0 953 506, U.S. Pat. No. 5,137,230, and U.S. Patent Application Publication No. 2009/0064658. A brief discussion of these references is provided below.

U.S. Patent Application Publication No. 2008/0230651 (hereinafter "the '651 Application") describes a turbofan provided with a precooler. In a first embodiment, the precooler 18 is positioned within an upper part 13S of a fan duct 13. (The '651 Application at paragraph [0033].) In a second embodiment, the precooler 31 includes a scoop 32 to capture some of the cold air stream 9 (i.e., the ambient air) and carry it to the precooler 31. (The '651 Application at paragraph [0037].) In a third embodiment, the precooler 38 is disposed in an upper part 12S of a chamber 12 surrounding the generator. (The '651 Application at paragraph [0040].)

U.S. Patent Application Publication No. 2009/0000305 (hereinafter "the '305 Application") describes a dual flow turbine engine equipped with a precooler. FIG. 1 in the '305 Application illustrates a prior art turbine engine, where the precooler 19 is positioned within an upper part of the fan duct 13. (The '305 Application at paragraph [0039].) FIG. 2 illustrates an embodiment of the precooler 30, where the precooler 30 is not positioned within the fan duct 13. (The '305 Application at paragraph [0042].)

U.S. Patent Application Publication No. 2009/0007567 (hereinafter "the '567 Application") lists the same inventors as the '305 Application and includes drawings that are very similar to the drawings provided in the '305 Application. The '567 Application describes a dual flow turbine engine equipped with a precooler 30 positioned inside an intermediate chamber 12 of the engine, in thermal contact with a rear part 10R of the fairing 10. (The '567 Application at paragraph [0046].) An air intake 27 is positioned upstream of the precooler 30 so that, when opened, a current of cooling air 29 may be bled from the cold flow 9. (The '567 Application at paragraph [0047].) The air intake 27 is provided with a shut off means 28. (The '567 Application at paragraph [0047].)

European Patent No. EP 0 953 506 (hereinafter "the '506 Patent") describes a flow control apparatus for gas turbine engine installation pressure relief doors. Specifically, the '506 Patent describes pressure relief doors 12 that are operable during an engine failure event. (The '506 Patent at paragraph [0011].) The relief doors 12 include side walls 42 that alter the flow of the hot air passing through the relief doors 12. (The '506 Patent at paragraph [0011].) By altering the flow of the hot air, hot engine gases do not stay in contact with the engine shroud 16 for as long a period of time as with prior art designs, thereby minimizing the possibility of damage to the engine. (The '506 Patent at paragraph [0011].) One type of engine failure mentioned in the '506 Patent is a bleed duct failure. (The '506 Patent at paragraph [0004].)

U.S. Pat. No. 5,137,230 (hereinafter "the '230 Patent") describes an aircraft turbine engine bleed air recovery apparatus. In particular, the '230 Patent describes an environmental control system ("ECS") with a boundary layer bleed compressor 64, driven by a turbine 63, that draws boundary layer suction air into a precooler heat exchanger 69. (The '230 Patent at col. 6, lines 36-41.) The precooler heat exchanger 69 cools the bleed air, which is used for the aircraft ECS. (The '230 Patent at col. 6, lines 36-41.) In cases where the demand for bleed air exceeds the capacity of the nozzle 65 or the turbine 63, bleed air may bypass the turbine 63 via a bypass valve 72. (The '230 Patent at col. 6, lines 55-59.) A controller 82 controls the flow rate of bleed air to the ECS pack 80. (The '230 Patent at col. 7, lines 3-14.)

U.S. Patent Application Publication No. 2009/0064658 (hereinafter "the '658 Application") describes a bypass turbomachine capable of reducing jet noise. The turbomachine 10 is designed to provide reverse thrust via the operation of covers 30 and openings that redirect the flow of the engine's output thrust. (The '658 Application at paragraph [0038].)

With respect to precoolers, it has been found that, under certain operating conditions, the fan in the engine may not be able to provide enough cold air pressure to the precooler to enable all the onboard functions desired for the aircraft.

In the case on an engine failure or an engine bleed system failure, it is contemplated that the remaining engine(s) and respective precooler(s) will have a sufficient load capacity to supply enough cooled bleed air to the HVAC system to make up for output from the lost engine and precooler.

However, if one engine fails or one engine bleed system fails and the aircraft enters an ice condition, it is possible that the remaining precooler(s) may not be able to cool enough hot bleed air to supply both the HVAC system and the anti-icing system at the same time. In such rare circumstances, it may be necessary for the aircraft to change course to avoid the ice condition, thereby reducing the demand on the remaining precooler(s). Naturally, where an aircraft changes course, the flight may be disrupted. Moreover, the aircraft may be prevented from reaching its destination and may be required to land for maintenance.

As should be apparent to those skilled in the art, this problem may be addressed by providing a larger outlet to the chamber or channel into which the precooler discharges, i.e., a larger core ventilation outlet area. However, a larger outlet may negatively affect aircraft performance, even during normal system operation, since core exhaust recovery is reduced.

This problem also may be addressed by increasing the size of the precooler. A larger precooler, however, will add mass to the aircraft, will likely increase installation difficulty, and may further disrupt the flow of air within or around the engine.

Thus, there is a need for a system which, by virtue of its design and components, is able to overcome one or more of the above-discussed problems with the prior art.

Additionally, there is a need for a system or method for operating a precooler in an aircraft that temporarily improves the performance of the precooler.

Moreover, there is a need for a system or method for operating a precooler that enables operation of one or both the aircraft's HVAC system and the aircraft's anti-icing system when there is an engine failure or an engine bleed system failure, without unduly affecting the aircraft's performance, during normal operating conditions.

SUMMARY OF THE INVENTION

It is, therefore, one aspect of the present invention to address at least one of the difficulties identified with respect to the prior art.

Among other features, the present invention provides a system which, by virtue of its design and components, satisfies at least one of the above-mentioned needs and is, thus, an improvement over related devices known in the prior art.

Indeed, in one aspect of the present invention, a system for operating a precooler in an aircraft is provided. In this aspect, it is contemplated that the aircraft includes two turbine engines, each turbine engine being operable to provide a stream of hot bleed air for use in an aircraft system. For each turbine engine, the aircraft includes a nacelle surrounding the turbine engine. The nacelle forms a cavity through which air can flow. The cavity has a front air inlet and a rear air outlet. A fan is positioned within the nacelle proximate to the front air inlet for drawing cold air through the nacelle. A precooler is provided for producing a stream of cooled, hot bleed air. The precooler includes a hot air inlet for receiving the stream of hot bleed air, a cold air inlet for receiving a stream of cold air (i.e., ambient air) drawn by the fan, a heat exchanger for transferring heat from the hot bleed air to the cold air, a cooled, hot air outlet for releasing the stream of cooled hot bleed air, and a heated cold air outlet for releasing a stream of heated cold air to the cavity.

For the present invention, it is contemplated that, for each turbine engine, the system includes a pressure control mechanism for temporarily increasing the pressure differential across the precooler from the cold air inlet to the heated cold air outlet, the pressure control mechanism being positioned proximate to the rear air outlet and also being operable to lower the air pressure at the heated cold air outlet.

Preferably, the pressure control mechanism is responsive to one of an engine failure, an engine bleed system failure, an ice condition, activation of an anti-ice system, and/or a bleed system performance signal, among other possible triggering inputs.

In one embodiment, the stream of cooled, hot bleed air is contemplated to be provided at least to an HVAC system and to an anti-icing system.

Another aspect of the present invention provides for a method of temporarily increasing the performance of a precooler in an aircraft. In this embodiment, the aircraft is contemplated to include two turbine engines, each turbine engine being operable to provide a stream of hot bleed air for use in a HVAC system and in an anti-icing system during an ice condition. In this embodiment, the turbine engines are contemplated to include a nacelle surrounding the turbine engine. The nacelle forms a cavity through which air can flow. The cavity has a front air inlet and a rear air outlet. A fan is positioned within the nacelle proximate the front air inlet for drawing cold air through the nacelle. A precooler for producing a stream of cooled hot bleed air is provided. The precooler includes a hot air inlet for receiving the stream of hot bleed air, a cold air inlet for receiving a stream of cold air drawn by the fan, a heat exchanger for transferring heat from hot bleed air to cold air, a cooled hot air outlet for releasing the stream of cooled hot bleed air, a heated cold air outlet for releasing a stream of heated cold air to the cavity, and a pressure control mechanism for temporarily increasing the pressure difference across the cold air inlet and heated cold air outlet. The pressure control mechanism is contemplated to be positioned proximate the rear air outlet.

According to this embodiment, the method includes detecting at least one of an engine failure, an engine bleed system failure, an ice condition and activation of an anti-ice system, and actuating the pressure control mechanism in response to the detection of the at least one of an engine failure, an engine bleed system failure, an ice condition and activation of an anti-ice system to lower the air pressure at the heated cold air outlet.

It is contemplated that each pressure control mechanism will include a pressure relief door provided in the nacelle which opens the cavity and exposes the cavity to ambient pressure.

In addition, each nacelle may include an inner fixed structure surrounding the turbine engine and an engine cowl surrounding the inner fixed structure. The cavity may include an engine core compartment formed between the inner fixed structure and the turbine engine through which cold air for cooling the turbine engine can flow. The cavity further may include a fan bypass channel formed between the engine cowl and the inner fixed structure through which cold air for providing thrust flows.

It is contemplated that the heated cold air outlet releases the stream of heated cold air to the engine core compartment.

In one embodiment, the pressure control mechanism may be provided on the inner fixed structure.

In another embodiment, the cold air inlet may include a scoop for increasing the amount of cold air received by the precooler.

It is contemplated that embodiments of the present invention advantageously increase the flow of cold air through the precooler and thereby improve the precooler's performance when the precooler's normal operating performance is insufficient, such as when another turbine engine fails or engine bleed system fails and when an ice condition is encountered or anti-ice system is activated.

One embodiment of the present invention concerns an aircraft engine with a nacelle having an air inlet and an air outlet. A cavity is defined within the nacelle. The cavity permits air to pass through the nacelle from the air inlet to the air outlet. A combustion region also is defined within the nacelle, separate from the cavity. The combustion region receives the air from the air inlet, combusts fuel in the presence of the air to produce combustion gases, discharges the combustion gases through the air outlet, and produces bleed air taken from at least one position between the air inlet and the air outlet. A fan is disposed proximate to the air inlet for drawing the air through the nacelle. A precooler is disposed within the nacelle. The precooler defines an ambient air passage and a bleed air passage. Air passes through the precooler from an ambient air inlet to an ambient air outlet. Bleed air passes through the precooler from a bleed air inlet to a bleed air outlet. Heat is transferred between the air and the bleed air via heat exchange within the precooler. At least one pressure relief door disposed proximate to the air outlet. A controller is operatively connected to the pressure relief door. The controller at least opens the pressure relief door based on a demand for increased flow of air through the ambient air passage.

It is contemplated that the pressure relief door may not be a singular feature but may be a plurality of pressure relief doors.

It is also contemplated that the bleed air will have a temperature greater than the air. If so, the bleed air is contemplated to be cooled to a predetermined temperature, within the precooler, via heat exchange with the air. It is anticipated that the predetermined temperature may be between about 200° C. to 232° C.

In one embodiment, it is contemplated that the precooler includes a scoop positioned upstream of the ambient air inlet.

In another embodiment, it is contemplated that the air passage and the bleed air passage may be separate from one another such that the air and bleed air are prevented from intermixing during the heat exchange.

Alternatively, it is contemplated that the air passage and the bleed air passage may permit intermixing of the air and bleed air during the heat exchange.

In another embodiment, the bleed air may be taken from positions proximate to both a high pressure turbine and a low pressure turbine.

It is contemplated that the demand for increased flow of air through the ambient air passage may be conditioned upon trigger variables, which comprise at least one signal indicative of an engine failure, a bleed air system failure, an ice condition, or activation of an anti-icing system.

Trigger variables also may include at least one signal indicative of flow of air, flow of bleed air, pressure at the ambient air inlet, pressure at the ambient air outlet, pressure at the bleed air inlet, pressure at the bleed air outlet, outside air temperature, temperature at the air inlet, temperature at the air outlet, temperature at the bleed air inlet, temperature at the bleed air outlet, differential pressure between the air inlet and the air outlet, differential pressure between the bleed air inlet and the bleed air outlet, weight on wheel off, altitude of the aircraft, and time.

The controller may be operatively connected to the pressure relief door to close the pressure relief door based on a demand for decreased flow of air through the ambient air passage.

The present invention also contemplates a method of operating an aircraft engine having a nacelle with an air inlet and an air outlet, a cavity defined within the nacelle, the cavity permitting air to pass through the nacelle from the air inlet to the air outlet, a combustion region defined within the nacelle, separate from the cavity, the combustion region receiving the air from the air inlet, combusting fuel in the presence of the air to produce combustion gases, discharging the combustion gases through the air outlet, and producing bleed air taken from at least one position between the air inlet and the air outlet, a fan disposed proximate to the air inlet for drawing the air through the nacelle, a precooler disposed within the nacelle, the precooler defining an ambient air passage and a bleed air passage, wherein the air passes through the precooler from an ambient air inlet to an ambient air outlet, wherein the bleed air passes through the precooler from a bleed air inlet to a bleed air outlet, and wherein heat is transferred between the air and the bleed air via heat exchange within the precooler, at least one pressure relief door disposed proximate to the air outlet, and a controller operatively connected to the pressure relief door, wherein the controller at least opens the pressure relief door based on a demand for increased flow of air through the ambient air passage. In this aspect of the invention, the method includes receiving, by the controller, trigger variables, evaluating the trigger variables to determine if the air passing through the ambient air passage is cooling the bleed air passing through the bleed air passage to a predetermined temperature, and opening the pressure relief door, if the trigger variables require an increased flow of air through the ambient air passage.

The method also contemplates closing the pressure relief door, if the trigger variables require a decreased flow of air through the ambient air passage.

The present invention also contemplates a method for controlling a pressure control mechanism in a turbofan engine having a precooler permitting heat exchange between air and bleed air. The method encompasses detecting at least one of an engine failure or a bleed system failure, detecting an ice condition and activation of an anti-ice system, and actuating a pressure control mechanism, thereby altering the heat exchange between the air and the bleed air.

In this method, the pressure control mechanism is contemplated to be a pressure relief door disposed proximate to an outlet of the turbofan engine.

The pressure control mechanism may be actuated upon the detection of a combination of at least one of an engine failure or a bleed system failure and at least one of an ice condition or activation of the anti-ice system.

In the method, actuating the pressure control mechanism includes opening a pressure relief door in the turbofan engine.

In addition, the present invention encompasses a control system for controlling at least one pressure relief door on an aircraft engine comprising a nacelle with an air inlet and an air outlet, a cavity defined within the nacelle, the cavity permitting air to pass through the nacelle from the air inlet to the air outlet, a combustion region defined within the nacelle, separate from the cavity, the combustion region receiving the air from the air inlet, combusting fuel in the presence of the air to produce combustion gases, discharging the combustion gases through the air outlet, and producing bleed air taken from at least one position between the air inlet and the air outlet, a fan disposed proximate to the air inlet for drawing the air through the nacelle, a precooler disposed within the nacelle, the precooler defining an ambient air passage and a bleed air passage, wherein the air passes through the precooler from an ambient air inlet to an ambient air outlet, wherein the bleed air passes through the precooler from a bleed air inlet to a bleed air outlet, wherein heat is transferred between the air and the bleed air via heat exchange within the precooler, and wherein the at least one pressure relief door is disposed proximate to the air outlet, and a controller operatively connected to the pressure relief door, wherein the controller at least opens the pressure relief door based on a demand for increased flow of air through the ambient air passage. Here, the control system encompasses a controller configured to receive trigger variables, an actuator operatively connected to the at least one pressure relief door, the actuator being configured at least to open the pressure relief door, a communication line operatively connecting the controller to the actuator, wherein, after evaluating the trigger variables and determining if the air passing through the ambient air passage is cooling the bleed air passing through the bleed air passage to a predetermined temperature, the controller sends a signal to open the pressure relief door, if the trigger variables require an increased flow of air through the ambient air passage.

For the control system, it is contemplated that the controller may send a signal to close the pressure relief door, if the trigger variables require a decreased flow of air through the ambient air passage.

Still other aspects of the present invention will be made apparent from the discussion provided herein.

BRIEF DESCRIPTION OF THE DRAWINGS

The present invention will now be described in connection with the following figures, in which.

DETAILED DESCRIPTION OF EMBODIMENT(S) OF THE INVENTION

While the invention will be described in conjunction with specific embodiments. It should be understood that the discussion of any one, particular embodiment is not intended to be limiting of the scope of the present invention. To the contrary, the specific, enumerated embodiments are intended to illustrate a wide variety of alternatives, modifications, and equivalents that should be apparent to those of ordinary skill in the art. The present invention is intended to encompass any such alternatives, modifications, and equivalents as if discussed herein.

In the following description, the same numerical references are intended to refer to similar elements. The re-use of reference numerals for different embodiments of the present invention is intended to simplify the discussion of the present invention. It should not be inferred, therefore, that the re-use of reference numbers is intended to convey that the associated structure is identical to any other described embodiment.

Although the preferred embodiments of the present invention as illustrated in the accompanying drawings comprise various components, and although the preferred embodiments of the system and corresponding parts of the present invention as shown consist of certain geometrical configurations as explained and illustrated herein, not all of these components and geometries are essential to the invention and, thus, should not be taken in their restrictive sense, i.e., should not be taken as to limit the scope of the present invention.

It is to be understood, as should be apparent to a person skilled in the art, that other suitable components and cooperations therebetween, as well as other suitable geometrical configurations may be used for a system according to the present invention, as will be briefly explained herein and as may be easily inferred herefrom by a person skilled in the art, without departing from the scope of the invention.

Additionally, it should be appreciated that positional descriptions such as "front," "rear," and the like are, unless otherwise indicated, to be taken in the context of the figures and should not be considered limiting of the present invention.

It will be appreciated that the present invention may be practiced without the specific details which have been set forth herein below in order to provide a thorough understanding of the invention.

The method of the present invention is described herein as a series of steps. It will be understood that this method and the associated steps may be performed in any logical order. Moreover, the method may be performed alone, or in conjunction with other procedures and methods before, during or after such methods and steps set forth herein without departing from the scope of the present invention.

Figure 1:
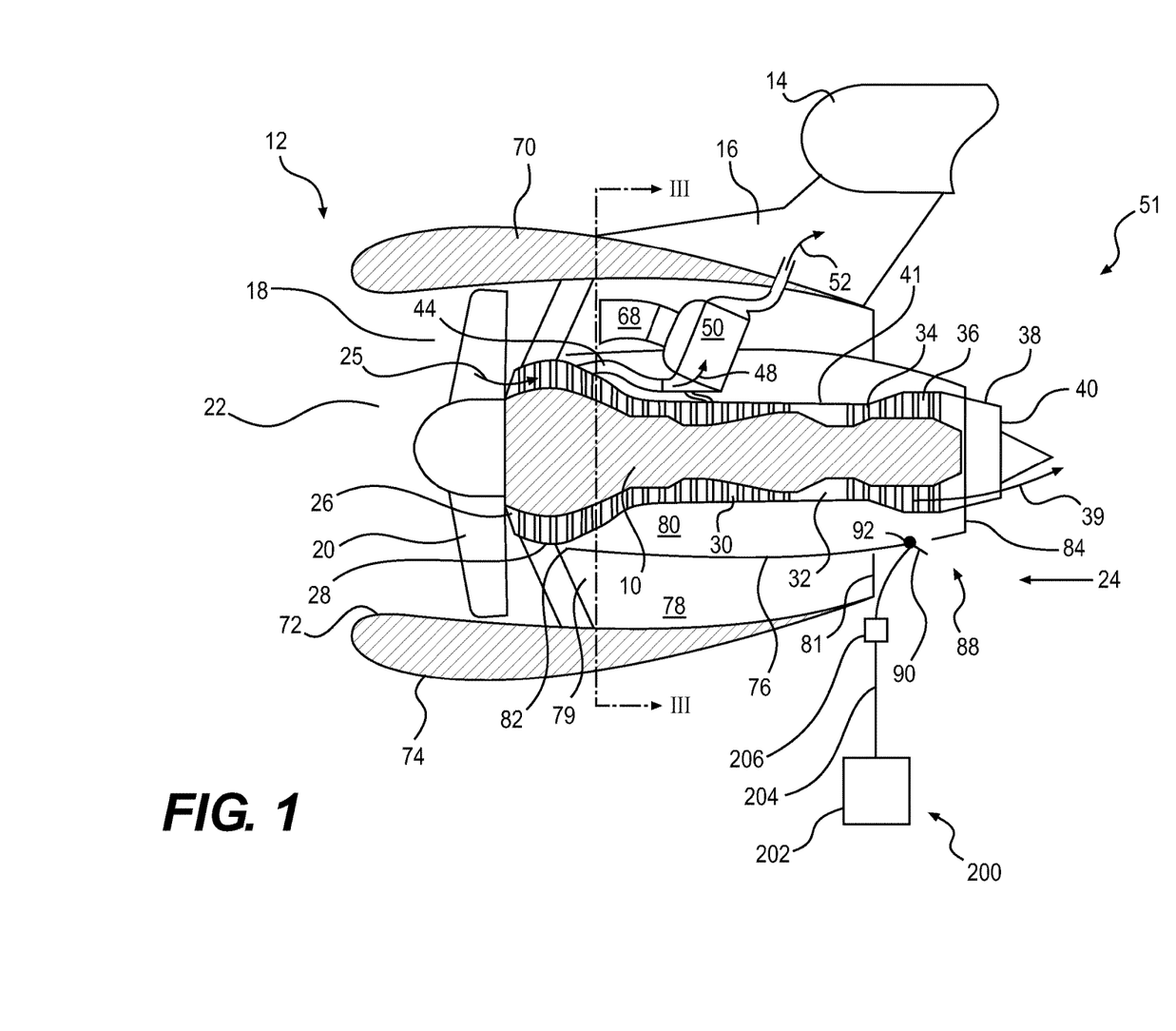
FIG. 1 is a schematic cross-sectional side view of a turbine engine and system according to an embodiment of the present invention.

FIG. 1 shows a schematic representation of a turbine engine 10 housed within a nacelle 12. The nacelle 12 has a tubular shape and is suspended from a wing 14 by a pylon 16. The nacelle 12 forms an annular cavity 18 around the turbine engine 10 through which air can flow. In use, the turbine engine 10 drives a fan 20 positioned in front of the turbine engine 10, which draws ambient air 25 into the cavity 18 through a front air inlet 22. This fan air (the ambient air 25) passes through the nacelle 12 and out of a rear air outlet 24. As will be discussed in further detail herein below, some of the ambient air 25 is mixed with fuel and combusted within the turbine engine 10 and some of the ambient air 25 is drawn past the turbine engine 10 to provide thrust. This arrangement is known as a turbofan. In addition, some of the ambient air 25 can also be used to ventilate the turbine engine 10, as will be discussed below.

As is known in the art, the cold air (i.e., ambient air) 25 enters the turbine engine 10 via a turbine inlet 26 and passes through a low pressure compressor 28 followed by a high pressure compressor 30. The ambient air 25 is then mixed with fuel and ignited in a combustion chamber 32. The combustion gasses 39 pass through high and low pressure turbines 34 and 36, causing rotation. The high and low pressure turbines 34, 36 are connected to the fan 20 and, due to their rotation, drive the fan 20. The combustion gases 39 exit from the high and low pressure turbines 34, 36 and exit through a nozzle 38 and a turbine outlet 40.

As illustrated in FIG. 1, the compressors 28 and 30, combustion chamber 32, and turbines 34 and 36 are enclosed by an engine casing 41, which forms the outer wall of the turbine engine 10.

The extraction and conditioning of bleed air 42 will now be now discussed in connection with the enlarged section of the turbine engine 10 illustrated in FIG. 2.

Figure 2:
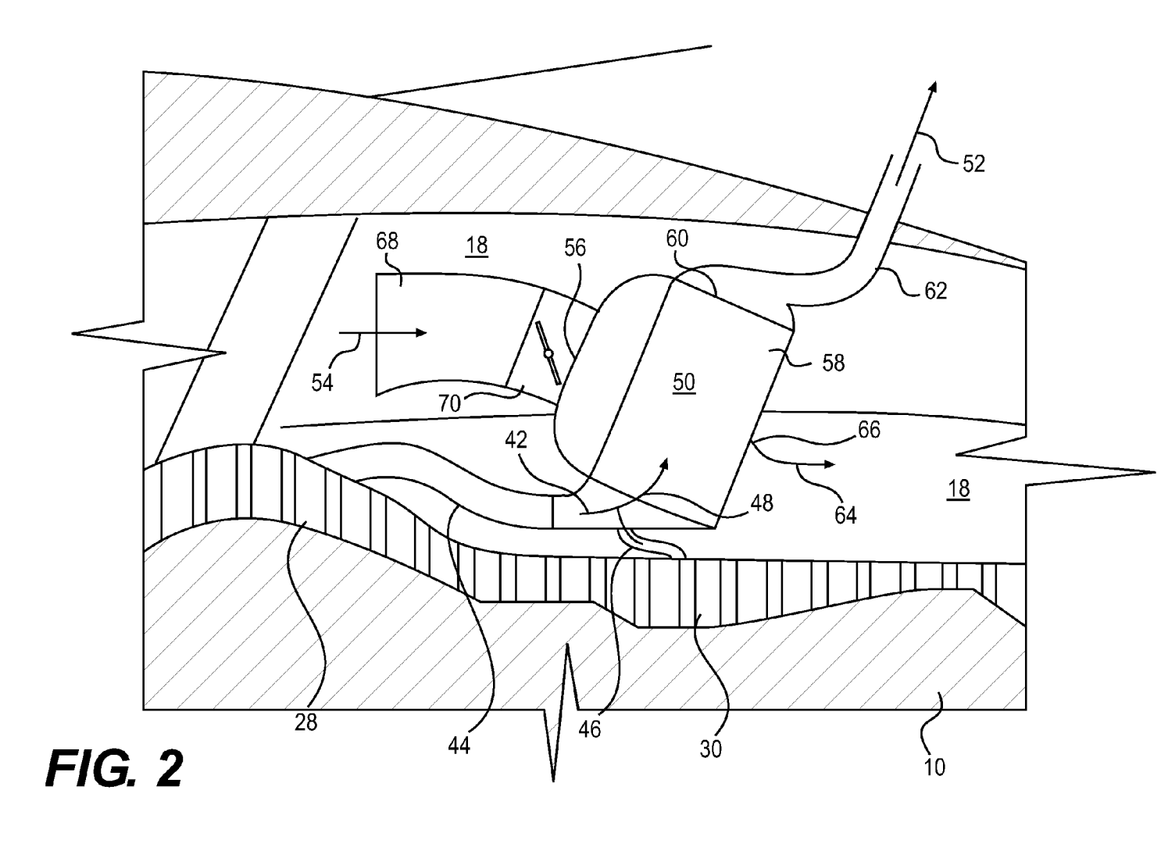
FIG. 2 is an enlarged section of a portion of the engine illustrated in FIG. 1.

With reference to FIG. 2, a stream of hot, compressed air 42 is bled from the turbine engine 10. This hot bleed air 42, which is preferably drawn from both the low and high pressure compressors 28 and 30 via conduits 44 and 46, respectively, is sent to the hot air inlet 48 of a precooler 50.

As discussed above, the precooler 50 serves to cool the stream of hot bleed air 42, producing a stream of cooled hot bleed air 52 which can be used, inter alia, in an aircraft's HVAC system and anti-icing system. It is also known to send the stream of the cooled bleed air 52 to the engine starter valve of the opposite engine. The precooler 50 is integrated into the aircraft by a system 51 which, as will be discussed in further detail below, may be advantageously used to improve its performance.

A stream of cold air 54, taken from the ambient air 25 drawn in by the fan 20, is received at a cold air inlet 56. The streams of cold air 54 and hot bleed air 42 pass through a heat exchanger 58 which, as is known in the art, allows heat energy from the stream of hot bleed air 42 to be transferred to the stream of cold air 54, thereby cooling the former and heating the latter.

The heat exchanger 58 may be embodied in a variety of ways. For example, the hot bleed air 42 may be fed through a plurality of tubes or fins made of a conductive material. The cold air 54, as it passes through the precooler 50, flows past the tubes or fins, thereby allowing the heat transfer to occur. In this way, the cold air 54 is heated to produce heated cold air 64. Similarly, the hot bleed air 42 is cooled to produce the cooled, hot bleed air 52.

To simplify the discussion that follows, and for purposes of consistency, the following convention is employed with respect to the two air streams entering and exiting the precooler 50. The cold, ambient air 54 entering the precooler 50 is referred to as the "ambient input air 54." The heated, cold air 64 exiting from the precooler 50 is referred to as the "ambient output air 64." Similarly, the hot bleed air 42 entering the precooler 50 is referred to as the "hot bleed input air 42." The cooled, hot bleed air 52 exiting from the precooler 50 is referred to as the "hot bleed output air 52." In addition, the cold air 25 drawn into the engine 10 by the fan 20 is referred to generally as the "ambient air 25." The bleed air 42 extracted from the engine 10 is referred to generally as the "bleed air 42."

As should be apparent from the foregoing discussion, and as should be apparent from the discussion that follows, the ambient air 25 may or may not intermix with the bleed air 42 in the precooler 50. In the illustrated embodiment, the ambient air 25 and the bleed air 42 flow through separate pathways and do not mix with one another. However, it is possible that the two streams 25, 42 may be mixed, partially or wholly, within the precooler 50 without departing from the scope of the present invention. In other words, the exact construction of the heat exchange portion of the precooler 50 is not critical for operation of the present invention.

The stream of hot bleed output air 52 exits the precooler 50 from a cooled hot air outlet 60, which is connected to the appropriate aircraft systems via a conduit 62. A stream of ambient output air 64 is discharged from a heated cold air outlet 66 into the cavity 18.

In the illustrated embodiment, a scoop 68 is provided at the cold air inlet 56 so as to increase the volume and/or pressure of the ambient air 25 captured and fed into the precooler 50. As will be appreciated by those skilled in the art, the scoop 68 may be designed to maximize inlet pressure and minimize the pressure loss of the flow of ambient air 25 therein. A fan air valve 70 for regulating the stream of the ambient input air 54, and thereby the temperature of the hot bleed output air 52, is also provided between the scoop 68 and the cold air inlet 56. The size and location of the fan air valve 70 is also chosen to maximize inlet pressure and minimize the pressure drop.

In FIG. 2, the valve 70 is illustrated as a butterfly valve. As should be apparent to those skilled in the art, other constructions for the valve 70 may be employed without departing from the scope of the present invention. In other words, the construction of the valve 70 is not critical to the present invention.

The majority of the ambient air 25 drawn into the fan 20 passes through the cavity 18, i.e., around the turbine engine 10 and the precooler 50, for propulsion. Only a small amount, typically no more than 1%, is fed into the precooler 50. It is noted, however, that a larger or smaller percentage of ambient air 25 may enter the precooler 50 without departing from the scope of the present invention. As such, the present invention is not limited to a construction that extracts less than 1% of the ambient air 25 from the total air stream.

Returning to FIG. 1, the nacelle 12 preferably includes two distinct structures: an engine cowl 70 and an inner fixed structure 76. The cowl 70 defines inner fairings 72 and outer fairings 74. The cowl 70 also forms the outermost housing for the engine 10 and the precooler 50. The front air inlet 22 is bound by the inner fairing 72, while the cavity 18 extends around the turbine engine 10, between the inner fairing 72 and the engine casing 41.

The inner fixed structure 76 is a thin member that extends concentrically between the cowl 70 and the engine casing 41. This inner fixed structure 76 effectively divides the cavity 18 into two parts or segments.

The first part or segment defined by the inner fixed structure 76 is an engine fan bypass channel 78. The engine bypass channel 78 extends radially between the engine cowl 70 and the inner fixed structure 76, and longitudinally between a front bypass inlet 79 and a rear bypass outlet 81. It is the ambient air 25 drawn by the fan 20 into and through the fan bypass channel 78 that generates thrust.

The second part or segment defined by the inner fixed structure 76 is an additional channel, called the engine core compartment 80. The engine core compartment 80 may be used to ventilate the engine 10. In addition, various engine accessories may be installed within the engine core compartment 80. The engine core compartment 80 extends radially between the engine casing 41 and the inner fixed structure 76 and longitudinally between a front ventilation inlet 82 and a rear ventilation outlet 84. As ambient air 25 flows into the inlet 82, across the engine casing 41 and out of the outlet 84, the ambient air 25 may be used to cool the engine 10 and the combustion chamber therewithin without affecting the rest of the flow through the fan bypass channel 78.

As is known in the art, and as shown in FIG. 1, the rear portion of the inner fixed structure 76, that is to say a portion proximate the nozzle 38, extends beyond the engine cowl 70.

The precooler 50 may be disposed within the fan bypass channel 78 or the engine core compartment 80, as both receive ambient air 25 drawn in by the fan 20. As mentioned above, the precooler 50 alternatively may be located within or above the pylon 16 without departing from the scope of the present invention. In the illustrated embodiment, the precooler 50 is disposed wholly within the engine core compartment 80.

Figure 3:
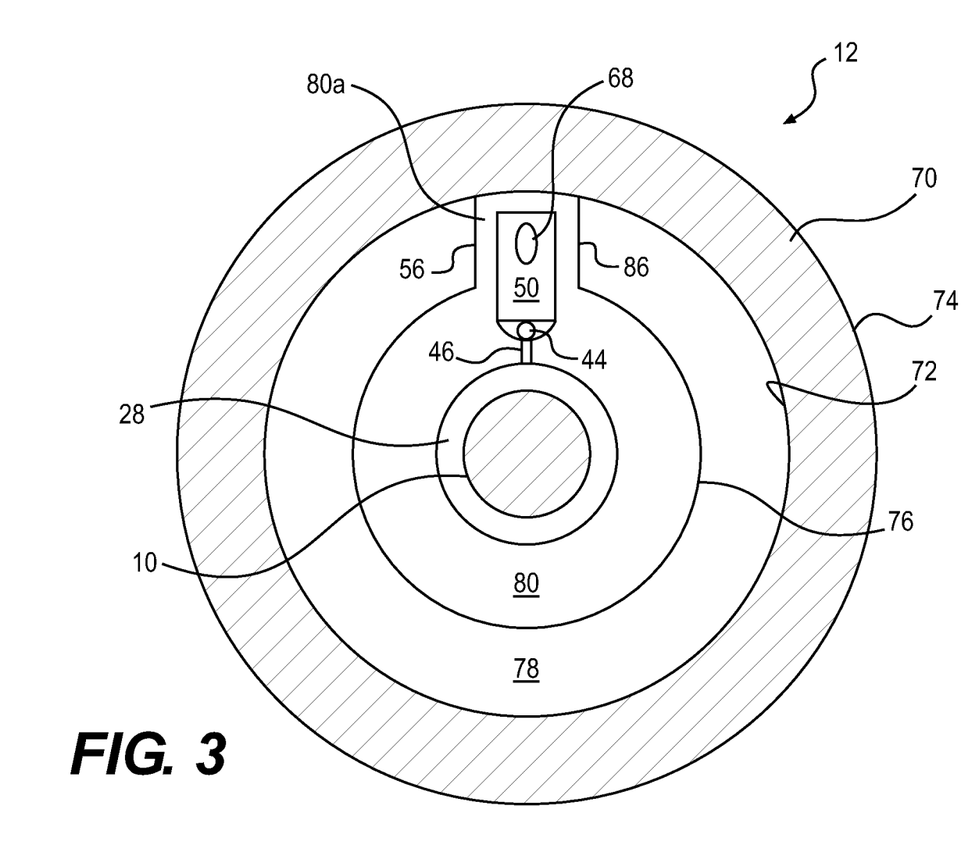
FIG. 3 is a cross-sectional front view of the engine illustrated in FIG. 1, the cross-section being taken along line III-III in FIG. 1.

With reference to FIG. 3, it is noted that the fan bypass channel 78 and the engine core compartment 80 are not completely concentric. Rather, the fan bypass channel 78 forms an annular segment that is discontinuous at the location where it is intersected by an upwardly projecting extension 80a of the engine core compartment 80. The inner fixed structure 76 includes two vertically extending sections 86 which intersect the inner fairing 72, thereby forming the extension 80a above the engine 10.

It should be appreciated, however, that the radial location of the extension 80a is not critical to operation of the present invention. The extension 80a may project downward from the engine 10, to the side of the engine 10, or at an angle from the engine 10 (between the upward and downward positions) without departing from the scope of the present invention.

As illustrated, the precooler 50 is positioned within the extension 80a such that both the cold air inlet 56 and the heated cold air outlet 66 are in communication with the ambient air 25 flowing through the engine core compartment 80. The stream of ambient output air 64 is thereby discharged into the engine core compartment 80 prior to being exhausted at the rear ventilation outlet 84. In this manner, the propulsive air driven through the fan bypass channel 78 is isolated from the precooler 50 and the stream of ambient output air 64 exhausted therefrom.

It should be appreciated that the pressure within the fan bypass channel 78 may be higher than that in the engine core compartment 80, which results in a smaller pressure difference across the precooler 50 positioned within the fan bypass channel 78. Such an arrangement is feasible if the stream of ambient output air 64 is discharged far to the rear of the engine cowl 70.

In use, the ambient air 25 is slightly compressed by the fan 20 as it enters the nacelle 12. Preferably, the pressure of the ambient input air 54 entering the precooler 50 is maximized by the scoop 68. It will be appreciated that the difference between the air pressure at the cold air inlet 56 and the back pressure within the engine core compartment 80 proximate to the heated cold air outlet 66 will, in large part, determine the performance of the precooler 50.

As discussed above, it is contemplated that a typical commercial aircraft will include two turbofan engines 10, each of which has its own precooler 50. In normal operation, each engine 10 and precooler 50 pair supplies half of the hot bleed output air 52 to the HVAC system on the aircraft.

Figure 4:
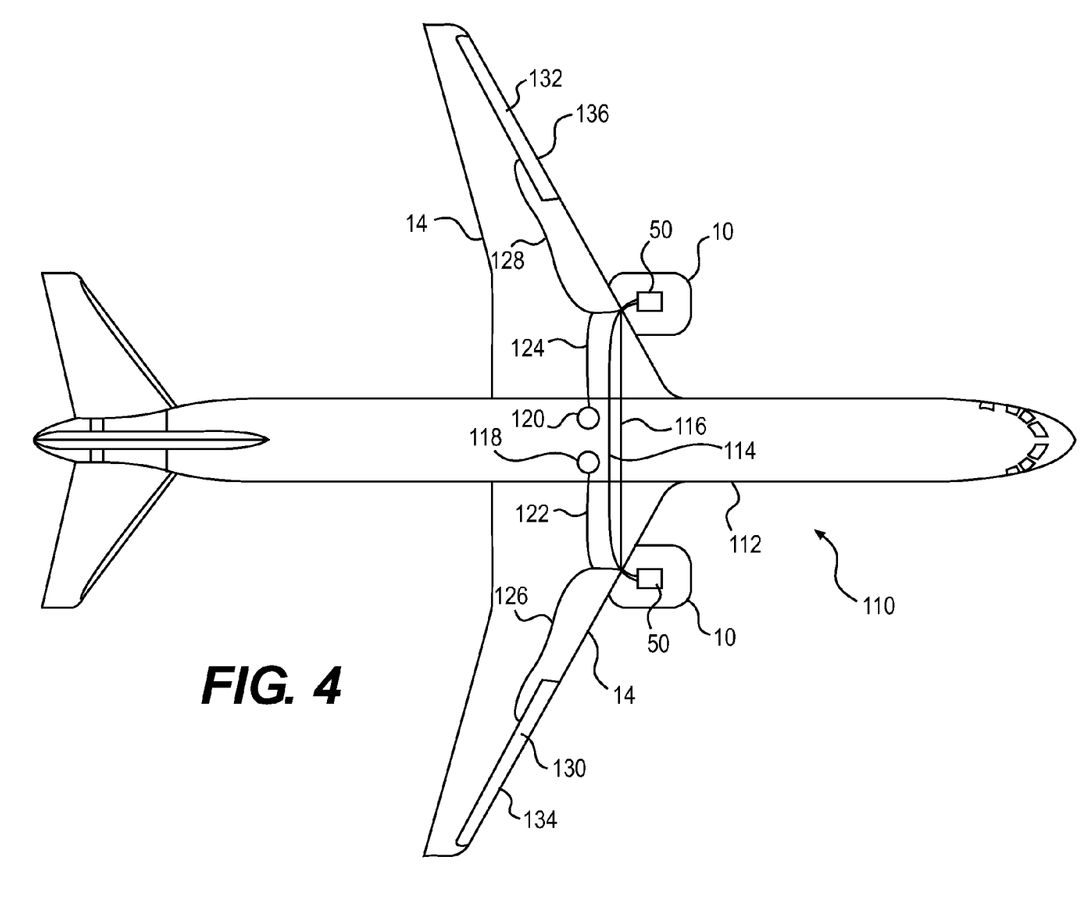
FIG. 4 is a graphical, top view of an aircraft embodying one contemplated embodiment of the system of the present invention.

FIG. 4 provides a graphical representation of a top view of one embodiment of an aircraft 110 and selected features for that aircraft 110. In the illustrated example, the aircraft 110 includes a fuselage 112, two wings 14, two engines 10, and two precoolers 50. Hot bleed output air 52 from each of the precoolers 50 passes through the conduits 62 to several components requiring the hot bleed output air 52. For example, some of the hot bleed output air 52 passes through a conduit 114, 116 from one engine 10 to the other engine 10. As noted above, this hot bleed output air 52 is inputted into the engine starter valve (not shown) for the opposing engine 10. Some of the hot bleed output air 52 is directed to the two HVAC systems 118, 120 (also referred to in the singular as the "HVAC system") on board the aircraft 110, via conduits 122, 124. As noted above, the HVAC systems 118, 120 use the hot bleed output air 52 to condition the cabin air by pressurizing and heating the cabin air, for example. In addition, the hot bleed output air 52 may pass through conduits 126, 128 to respective anti-icing systems 130, 132. The anti-icing systems 130, 132 utilize the hot bleed output air 52 to heat selected parts of the aircraft 110, i.e., the leading edges 134, 136 of the wings 14 that may be prone to icing during flight.

Figure 5:
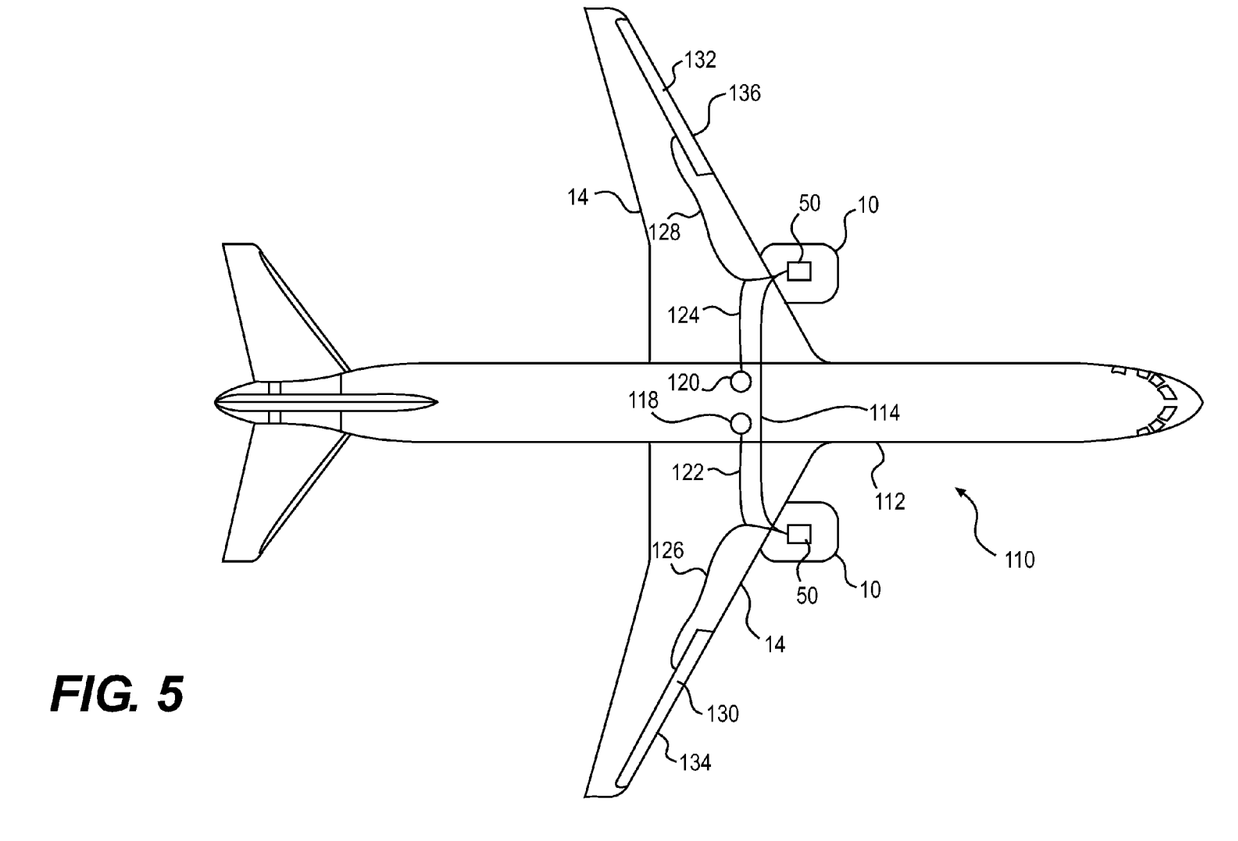
FIG. 5 is a graphical, top view of an aircraft embodying another contemplated embodiment of the system of the present invention.

FIG. 5 provides a graphical top view of a second embodiment of an aircraft 110. In this embodiment, the aircraft 110 does not include a conduit 116. Instead, the engines 10 share the same conduit 114. In this second embodiment, elimination of the conduit 116 simplifies the aircraft 110 and reduces the weight of the aircraft 110, which is advantageous for many reasons, as should be apparent to those skilled in the art.

While not illustrated for the two illustrated variants of the aircraft 110, the various conduits 114, 116, 122, 124, 126, 128 may include one or more valves and sensors that help to control the flow of the hot bleed output air 52 to the various components. In addition, while the HVAC systems 118, 120 and anti-icing systems 130, 132 are shown, the hot bleed output air 52 may be provided to any number of different systems without departing from the scope of the present invention.

It is noted that the various conduits 114, 116, 122, 124, 126, 128 illustrated for the aircraft 110 are exemplary only. A larger or a fewer number of conduits may be employed without departing from the scope of the present invention. Moreover, the conduits 114, 116, 122, 124, 126, 128 may be arranged in any configuration suitable for the aircraft 110 without departing from the scope of the present invention.

When the aircraft 110 is operating under conditions without ice formation (or "icing conditions"), the hot bleed output air 52 typically is provided to the HVAC systems 118, 120 to pressurize and heat (or cool) the air within the cabin. Under these conditions, there is a first demand placed upon the precoolers 50 to provide a sufficient quantity of hot bleed output air 52 for operation of the HVAC systems 118, 120.

When the aircraft 110 enters an ice (or "icing") condition, the anti-icing systems 130, 132 are activated. Since the anti-icing systems 130, 132 also require hot bleed output air 52 as a heating input, when the anti-icing systems 130, 132 are activated, the need for the additional hot bleed output air 52 places a second demand on the precoolers 50. In other words, the second demand on the precoolers 50 adds to the overall demand placed on these components. Each precooler 50 is, therefore, required to generate additional hot bleed output air 52 to meet the increased demand.

As should be apparent to those skilled in the art, the precoolers 50 are sized to meet the demand expected during normal operating conditions for the aircraft 110. Despite being sized appropriately, it is foreseeable that certain conditions may arise that are outside of the "normal" operation of the aircraft 110. These abnormal conditions, which may occur statistically in one out of 10,000 flights or less, also must be taken into account when sizing the precoolers 50 and the systems that the precoolers 50 support.

In certain abnormal operating conditions, it is possible that the precooler 50 may not supply a sufficient amount of hot bleed output air 52 for the aircraft 110. In particular, it is possible that, in the event of an engine failure or engine bleed failure (among other types of operational events), when a single engine 10 or single bleed system is called upon to make up for any lost capacity due to the inoperability of the failed engine or bleed system, the remaining precooler 50 cannot generate sufficient hot bleed output air 52. As a result, it is possible the air conditioning systems 118, 120 and/or the anti-icing systems 130, 132 may not operate properly due to a lack of sufficient hot bleed output air 52. Specifically, the remaining precooler 50 may not be able to cope with the increased demand for hot bleed output air 52.

It also should be appreciated that there are other operational circumstances that may arise during use of the aircraft 110 which require an above-normal supply of hot bleed output air 52 from a given engine 10 and precooler 50. As noted above, for example, when the HVAC systems 118, 120 and the anti-icing systems 130, 132 are operational at the same time, there is a considerable demand for hot bleed output air 52. If other systems are activated that also require hot bleed output air 52 (or if there is an engine failure or hot bleed system failure), the demand may exceed, at least momentarily, the ability of one or more of the precoolers 50 to meet the demand.

The system 51 is provided in order to improve the performance of the precooler 50 in situations which require the precooler 50 to cool higher than normal volumes of hot bleed air 42, under circumstances such as those described above. To accomplish this, a pressure control mechanism 88 is provided along the nacelle 12. The pressure control mechanism 88 is provided to temporarily increase the pressure difference across the precooler 50 from the cold air inlet 56 to the heated cold air outlet 66, thereby increasing both the flow of the ambient air 25 through the precooler 50. The pressure control mechanism 88, therefore, increases the ability of the precooler 50 to cool the hot bleed input air 42.

In the embodiment illustrated in FIG. 1, the pressure control mechanism 88 includes a pressure relief door 90, which is positioned along the inner fixed structure 76 between the precooler 50 and the nozzle 38. Preferably, the pressure relief door 90 is positioned along the rear section of the inner fixed structure 76, beyond the rear bypass outlet 81.

The pressure relief door 90 is mounted to the inner fixed structure 76, preferably by a pivotable connection 92, disposed along a front edge of the pressure relief door 90. In this arrangement, the pressure relief door 90 opens at its rear, as shown in FIG. 1.

It is noted that the pressure relief door 90 need not be positioned exactly where indicated in FIG. 1. The pressure relief door 90 may be located elsewhere without departing from the scope of the present invention. In addition, while one pressure relief door 90 is illustrated, it is contemplated that several pressure relief doors 90 may be employed without departing from the scope of the present invention.

It is noted that there are several mechanisms that may be employed to open and/or close the pressure relief door 90, upon the occurrence of circumstances that require opening of the pressure relief door 90.

In one contemplated embodiment, the pressure relief door 90 is designed only to open. In this contemplated embodiment, if the pressure relief door 90 opens during flight, the pressure relief door will remain opened until the aircraft 110 lands. After landing, the pressure relief door 90 may be closed by trained personnel, such as an aircraft mechanic. In this embodiment, the pressure relief door 90 may be biased to open using a solenoid, a spring, or other suitable mechanism capable of opening the pressure relief door 90 and keeping the pressure relief door 90 opened until closed by trained personnel.

In a second contemplated embodiment, the pressure relief door 90 may be opened and closed during flight by a suitable actuator. A solenoid, motor, or other device may be connected to the pressure relief door 90 so that the pressure relief door 90 may be opened when additional hot bleed output air 52 is needed. The pressure relief door 90 may then be closed when the demand for hot bleed output air 52 returns to a normal level. The actuator may be controlled by a switch, which may be electrically or pneumatically activated, as required or as desired.

As noted above, under normal operating conditions, such as when all of the engines 10 and the precoolers 50 are operating within normal parameters, the pressure relief door 90 remains closed. As discussed above, the air pressure at the cold air inlet 56 will be above the ambient pressure outside the nacelle 12 due to the fan 20 and, preferably, the scoop 68. The pressure within the engine core compartment 80 at the heated cold air outlet 66 will be below the pressure at the inlet 56, but will generally be slightly above that of the ambient outside air 25. When an increased capacity of the precooler 50 is required, the pressure relief door 90 can be opened so as to create additional venting area at the rear of the inner fixed structure 76.

The additional area increases the flow of air through the precooler 50, which allows a greater volume of hot bleed input air 42 to be processed into hot bleed output air 52. The additional area created when the pressure relief door is opened allows the pressure within the core engine compartment 80 to be released to the atmosphere. In other words, the resultant drop in pressure at the heated cold air outlet 66 increases the pressure difference across the precooler 50 and increases the flow rate of the ambient air 25 passing therethrough.

It will be appreciated however that opening the doors 90 and lowering the pressure at the rear of the engine core compartment 80, while improving the performance of the precooler 50, may negatively affect other operational parameters of the engine 10 by, for example, increasing drag and/or fuel consumption. Accordingly, the pressure relief door 90 is preferably only opened temporarily when maximum performance of the precooler 50 is required.

A control system 200 is preferably provided to control opening and closing of the door 90. The control system 200 responds to an increased demand on the precooler 50. For example, the control system 200 responds to a failure of an engine, a failure of a hot air bleed system, and/or activation and/or initiation of the anti-icing systems 130, 132, among other variables.

As illustrated in FIG. 1, the control system 200 depicted graphically as a controller 202 connected, via a communication line 204, to an actuator 206 that connects to the pressure relief door 90. It is contemplated that the controller 202 is configured to send an appropriate signal to the actuator 206 to open or close the pressure relief door 90. The actuator may be spring-operated, electrically motorized, hydraulically triggered, or pneumatically operated, as should be apparent to those skilled in the art. In other words, the operative mechanism of the actuator 206 is not critical to operation of the control system 200. While the control system 200 is illustrated in this simplistic manner, it should be understood that this illustration is not intended to be limiting of the present invention, as should become apparent from the discussion herein.

The present invention also provides a method of increasing performance of the precooler 50.

Figure 6:
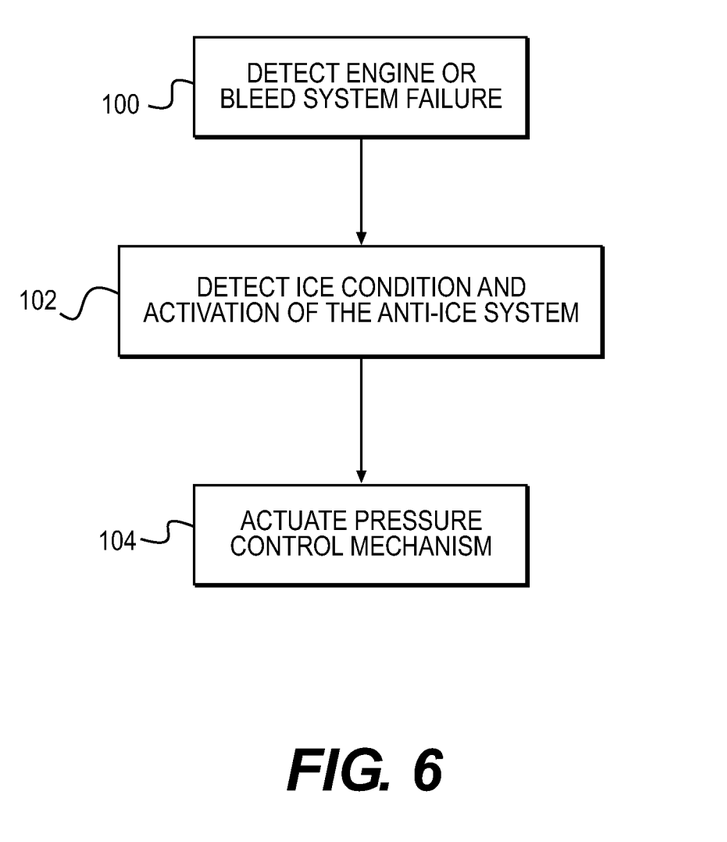
FIG. 6 is a flow chart illustrating steps contemplated for one method of increasing performance of a precooler according to one embodiment of the present invention.

With reference to FIG. 6, a pressure control mechanism 88 (which includes a suitable processor) may operate as follows. First, the mechanism 88 may detect, at step 100, when one of two or more engines 10 fails or when one of two or more bleed systems fail, thereby disabling the corresponding precooler 50 and increasing the amount of hot bleed air siphoned from the remaining engine(s) 10. Second, the mechanism 88 may detect, at step 102, when the aircraft enters an ice condition and therefore requires activation of the anti-icing systems 130, 132. In this regard, the mechanism may detect when ice protection is activated on the aircraft 110, which also requires additional hot bleed output air 52. Third, the mechanism 88 may actuate 104 the pressure relief doors 90 in response to the engine failure and/or ice condition, thereby lowering the air pressure at the heated cold air outlet 66.

It will be appreciated that various parameters can be monitored in order to detect 102 the need to boost precooler performance. As noted above, basic input parameters for the control system 200 include receipt of signals from various component on the aircraft 110 that monitor if an engine failure has occurred, if there has been a failure of the bleed air system for one of the engines 10, if there is an ice condition being experienced by the aircraft 110, if the anti-ice systems 130, 132 have been activated, or if there is an increased demand for the production of hot bleed output air 52. Preferably, the system 51 additionally monitors bleed system performance between the detecting step 102 and the actuating step 104.

It will therefore be appreciated that an aircraft which includes a precooler 50 and system 51 in accordance with the present invention may include modifications to the design of the front ventilation inlet 82, the rear ventilation outlet 84 and the rest of the inner fixed structure 76 to ensure optimal flow through the engine core compartment 80 during normal operation, thereby improving the efficiency and performance of the engine 10.

It will also be appreciated that the present invention should not be considered limited to the preferred embodiment shown in the figures. As noted above, although only one pressure relief door 90 is shown, it may be desirable to provide a plurality of pressure relief doors 90 distributed circumferentially around and/or longitudinally along the internal fixed structure 76. In addition, the pressure relief door 90, which is shown schematically, may be shaped and/or sized in different ways. For example, rather than a pivotally opening door, as illustrated in FIG. 1, the pressure relief mechanism 88 could be embodied by a sliding panel, sliding louvers or another means of increasing the exhaust area associated with the pressure relief door 90.

It will further be appreciated that, for a precooler 50 whose heated cold air outlet 66 discharges to the fan bypass channel 78 rather than the engine core compartment 80 as illustrated, the pressure relief mechanism 88 will be positioned along the engine cowl 70, preferably proximate the rear bypass outlet 81. Where the engine excludes an inner fixed structure 76, the pressure relief mechanism 88 may be positioned along the engine cowl 70.

Returning to the method of the present invention, there are a number of inputs that may be evaluated to provide a signal for the pressure relief door 90 to open at the appropriate time. To assess the various inputs that are available on the aircraft 110, the controller 202, which operatively connects to the pressure relief door 90, also is understood to operatively connect to one or more of the systems present on the aircraft.

In one instance, the controller 202 may be connected to the bleed air systems in the engines 10 to receive a signal indicating if one of the bleed air systems ceases to function. For example, sensors may be positioned on or near the conduits 44, 46. If one of the conduits 44, 46 should rupture, the sensor may be configured to indicate such a failure, which would be interpreted as a failure of the bleed air system. That signal could then be used, in combination with other signals, to determine if the pressure relief door 90 is to be opened.

In another instance, as indicated above, the controller 202 may be connected to the wing anti-icing system ("WAIS"). So connected, the controller 202 is anticipated to receive signals indicating if the WAIS is operating or not. In addition, the WAIS may be configured to indicate the amount of hot bleed output air 52 demanded by the WAIS at any given moment in time. If so, the controller 202 may be configured to trigger the opening of the pressure relief door 90 only after receipt of specific input signals associated with the amount of hot bleed output air 52 demanded by the WAIS.

In a further contemplated embodiment, the controller 202 may be configured to receive signals separately from the hot bleed air produced from the high and low pressure compressors 28, 30. As such, if a signal is received suggesting that too much or too little hot bleed air is being received from either of the compressors 28, 30, this may result in a trigger event where the pressure relief door 90 is opened or closed.

As noted above, bleed air may be taken from several locations within the engine 10. Specifically, bleed air may be taken from a location near to the low pressure compressor 28. Bleed air taken from this location may be at a temperature of up to about 120° C. Bleed air also may be taken from a location near to the high pressure compressor 30. If so, the bleed air may be at a temperature of up to about 500° C.

It is contemplated that, if the aircraft is in idle or in a descent mode, the bleed air may need to be taken from a position near to the high pressure compressor 30 to ensure sufficient bleed air pressure. A should be apparent, when the bleed air is taken from the high pressure compressor 30, since it is at a higher temperature, the need for cooling, ambient air is greater. When in idle or in a descent mode, the precooler 50 may require an increased flow of ambient air through the ambient air passage, which demand may be satisfied by opening the pressure relief door 90.

It is also noted that bleed air from both compressors 28, 30 may be combined in a controlled manner by the controller 202 or another system. For example, bleed air from the two compressors 28, 30 may be adjusted, in terms of their respective pressures, to produce hot bleed input air 42 having predetermined pressure and temperature characteristics.

Another signal that may be taken into account is a signal from the wheels of the aircraft 110. Specifically, aircraft 110 typically are equipped with sensors that provide a signal if there is a "weight on wheel off" event. This signal indicates if the aircraft 110 is on the ground or in flight. Specifically, the signal indicates if there is weight on the wheels or not. The controller 202 may be configured to accept this signal and, if the aircraft 110 is on the ground, the controller may be configured not to open the pressure relief door 90, for example.

In a further contemplated embodiment, the controller 202 may be configured to receive signals concerning the pressure and/or temperature of the hot bleed input air 42. If the pressure and/or temperature exceeds or falls below predetermined pressure and/or temperature thresholds, the controller 202 may be configured to open or close the pressure relief doors 90.

It is also contemplated that time may be a factor taken into account by the controller 202. For example, with respect to the pressure and/or temperature of the hot bleed input air 42, if the pressure and/or temperature are above or below a predetermined threshold for a predetermined period of time, the controller 202 may be configured to open or close the pressure relief door 90. By taking into account the time or duration of a pressure/temperature spike/depression, the controller 202 may avoid opening or closing the pressure relief door 90 during periods where there is a transient spike or depression that corrects itself within the window of the time period or duration.

Still further, while the operation of the controller 202 has been described in connection with the pressure and/or temperature of the hot bleed input air 42, similar triggering events may be defined for the hot bleed output air 52, the ambient input air 54, and/or the ambient output air 64. Sensors may be provided at various locations with respect to the precooler 50 to generate these signals for use by the controller 202.

Another embodiment of the aircraft 110 of the present invention contemplates that the controller 202 also will receive signals indicative of the altitude of the aircraft 110. The altitude signals also may be employed as a factor for the controller to issue a trigger signal that opens or closes the pressure relief door 90. For example, the controller 202 may be configured to keep the pressure relief door 90 closed in one instance of low altitude but opened in a separate instance at a higher altitude.

As should be apparent from the foregoing, pressure sensors are contemplated to be provided within the stream of the ambient input air 54 and also within the stream of the ambient output air 64. The pressure sensors provide information so that the controller 202 may determine what the pressure drop is across the precooler 50. If the pressure differential falls below a predetermined threshold, such as 0.5 psig or 1.0 psig, for example, the controller 202 may be configured to open the pressure relief door 90 to increase the pressure differential.

In the foregoing discussion, the operation of the pressure relief door 90 has been described as opened or closed. This is intended to convey that the pressure relief door 90 is opened or closed completely. In a separate embodiment, the controller 202 may be configured to open the pressure relief door 90 by only a fractional amount, depending upon the various input signals received thereby. In this configuration, it is contemplated that the pressure relief door 90 may be opened only partially to more accurately control the pressure differential across the precooler 50.

Figure 7:
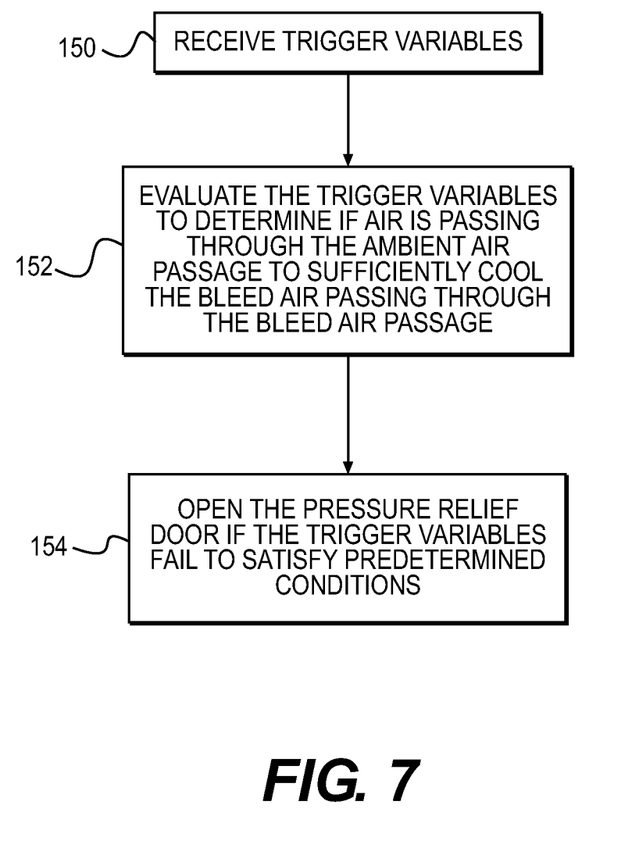
FIG. 7 is a flow chart illustrating steps contemplated for another method of increasing performance of a precooler according to another embodiment of the present invention.

In view of the foregoing, and with reference to FIG. 7, one embodiment of the method of the present invention contemplates a series of steps that include receiving by the controller 202, at step 150, trigger variables, evaluating the trigger variables, by the controller 202, at step 152, to determine if the air is passing through the ambient air passage to sufficiently cool the bleed air passing through the bleed air passage, and opening the pressure relief door 90, at step 154, if the trigger variables satisfy predetermined conditions.

The trigger variables include, among other variables, a signal indicative of an engine failure, a bleed air system failure, an ice condition, or activation of an anti-icing system. Other trigger variables include, but are not limited to a signal indicative of flow of air, flow of bleed air, pressure at the ambient air inlet, pressure at the ambient air outlet, pressure at the bleed air inlet, pressure at the bleed air outlet, outside air temperature, temperature at the air inlet, temperature at the air outlet, temperature at the bleed air inlet, temperature at the bleed air outlet, differential pressure between the air inlet and the air outlet, differential pressure between the bleed air inlet and the bleed air outlet, weight on wheel off, altitude of the aircraft, and time.

It will also be appreciated that the present invention could be advantageously employed in aircraft with more than two engines.

As being now better appreciated, the present invention is an improvement and presents several advantages over other related devices and/or methods known in the prior art. As should be apparent to those skilled in the art, numerous modifications could be made to the above-described embodiments without departing from the scope of the invention, as apparent to a person skilled in the art.

What is claimed is:

1. An aircraft engine, comprising:
 a nacelle with an air inlet and an air outlet;
 a cavity defined within the nacelle, the cavity permitting ambient air to pass through the nacelle from the air inlet to the air outlet;
 an inner fixed structure dividing the cavity into an engine core compartment and a fan bypass channel;
 a compressor region defined within the engine core compartment, the compressor region producing bleed air taken from at least one position between the air inlet and the air outlet;
 a precooler disposed within the nacelle, the precooler defining an ambient air passage and a bleed air passage, wherein the ambient air passes to the engine core compartment through the ambient air passage from an ambient air inlet to an ambient air outlet, wherein the bleed air passes through the bleed air passage from a bleed air inlet to a bleed air outlet, and wherein heat is transferred between the ambient air and the bleed air via heat exchange within the precooler;

at least one pressure relief door disposed on the inner fixed structure to create additional engine venting through the pressure relief door, when opened; and a controller operatively connected to the pressure relief door, wherein the controller at least opens the pressure relief door based on a demand for increased flow of the ambient air through the ambient air passage.

2. The aircraft engine of claim 1, wherein the at least one pressure relief door comprises a plurality of pressure relief doors.

3. The aircraft engine of claim 1, wherein the bleed air has a temperature greater than the ambient air.

4. The aircraft engine of claim 3, wherein the bleed air is cooled to a predetermined temperature within the precooler via the heat exchange with the ambient air.

5. The aircraft engine of claim 4, wherein the predetermined temperature is between about 200° C. to 232° C.

6. The aircraft engine of claim 1, wherein the precooler further comprises:
a scoop positioned upstream of the ambient air inlet.

7. The aircraft engine of claim 1, wherein the ambient air passage and the bleed air passage are separate from one another such that the ambient air and the bleed air are prevented from intermixing during the heat exchange.

8. The aircraft engine of claim 1, wherein the ambient air passage and the bleed air passage permit intermixing of the ambient air and the bleed air during the heat exchange.

9. The aircraft engine of claim 1, wherein the bleed air is taken from positions proximate to both a high pressure compressor and a low pressure compressor.

10. The aircraft engine of claim 1, wherein the demand for increased flow of the ambient air through the ambient air passage is conditioned upon trigger variables, which comprise at least one signal indicative of an engine failure, a bleed air system failure, an ice condition, or an activation of an anti-icing system.

11. The aircraft engine of claim 10, wherein the trigger variables further comprise at least one signal indicative of flow of the ambient air, flow of the bleed air, pressure at the ambient air inlet, pressure at the ambient air outlet, pressure at the bleed air inlet, pressure at the bleed air outlet, outside air temperature, temperature at the air inlet, temperature at the air outlet, temperature at the bleed air inlet, temperature at the bleed air outlet, differential pressure between the ambient air inlet and the ambient air outlet, differential pressure between the bleed air inlet and the bleed air outlet, weight on wheel off, altitude of the aircraft, and time.

12. The aircraft engine of claim 1, wherein the controller is operatively connected to the pressure relief door to close the pressure relief door based on a demand for decreased flow of the ambient air through the ambient air passage.

13. A method of operating an aircraft engine comprising a nacelle with an air inlet and an air outlet, a cavity defined within the nacelle, the cavity permitting ambient air to pass through the nacelle from the air inlet to the air outlet, an inner fixed structure dividing the cavity into an engine core compartment and a fan bypass channel, a compressor region defined within the engine core compartment, the compressor region producing bleed air taken from at least one position between the air inlet and the air outlet, a precooler disposed within the nacelle, the precooler defining an ambient air passage and a bleed air passage, wherein the ambient air passes to the engine core compartment through the ambient air passage from an ambient air inlet to an ambient air outlet, wherein the bleed air passes through the bleed air passage from a bleed air inlet to a bleed air outlet, and wherein heat is transferred between the ambient air and the bleed air via heat exchange within the precooler, at least one pressure relief door disposed on the inner fixed structure to create additional engine venting through the pressure relief door, when opened, and a controller operatively connected to the pressure relief door, wherein the controller at least opens the pressure relief door based on a demand for increased flow of the ambient air through the ambient air passage, the method comprising:

receiving, by the controller, trigger variables;

evaluating the trigger variables, by the controller, to determine if the ambient air passing through the ambient air passage is cooling the bleed air passing through the bleed air passage to a predetermined temperature; and opening the pressure relief door, if the trigger variables require an increased flow of the ambient air through the ambient air passage.

14. The method of claim 13, further comprising:
closing the pressure relief door, if the trigger variables require a decreased flow of the ambient air through the ambient air passage.

15. The method of claim 13, wherein the trigger variables comprise at least one signal indicative of an engine failure, a bleed air system failure, an ice condition, and activation of an anti-icing system.

16. The method of claim 15, wherein the trigger variables further comprise at least one signal indicative of flow of the ambient air, flow of the bleed air, pressure at the ambient air inlet, pressure at the ambient air outlet, pressure at the bleed air inlet, pressure at the bleed air outlet, outside air temperature, temperature at the air inlet, temperature at the air outlet, temperature at the bleed air inlet, temperature at the bleed air outlet, differential pressure between the ambient air inlet and the ambient air outlet, differential pressure between the bleed air inlet and the bleed air outlet, weight on wheel off, altitude of the aircraft, and time.

17. A control system for controlling at least one pressure relief door on an aircraft engine comprising a nacelle with an air inlet and an air outlet, a cavity defined within the nacelle, the cavity permitting ambient air to pass through the nacelle from the air inlet to the air outlet, an inner fixed structure dividing the cavity into an engine core compartment and a fan bypass channel, a compressor region defined within the engine core compartment, producing bleed air taken from at least one position between the air inlet and the air outlet, a precooler disposed within the nacelle, the precooler defining an ambient air passage and a bleed air passage, wherein the ambient air passes to the engine core compartment through the ambient air passage from an ambient air inlet to an ambient air outlet, wherein the bleed air passes through the bleed air passage from a bleed air inlet to a bleed air outlet, wherein heat is transferred between the ambient air and the bleed air via heat exchange within the precooler, the at least one pressure relief door disposed on the inner fixed structure to create additional engine venting through the pressure relief door, when opened, and a controller operatively connected to the pressure relief door, wherein the controller at least opens the pressure relief door based on a demand for increased flow of the ambient air through the ambient air passage, the system comprising:

a controller configured to receive trigger variables;

an actuator operatively connected to the at least one pressure relief door, the actuator being configured at least to open the pressure relief door;

a communication line operatively connecting the controller to the actuator;

wherein, after evaluating the trigger variables and determining if the ambient air passing through the ambient air passage is cooling the bleed air passing through the bleed air passage to a predetermined temperature, the controller sends a signal to open the pressure relief door, if the trigger variables require an increased flow of the ambient air through the ambient air passage.

18. The control system of claim 17, wherein the controller sends a signal to close the pressure relief door, if the trigger variables require a decreased flow of the ambient air through the ambient air passage.

19. The control system of claim 17, wherein the trigger variables comprise at least one signal indicative of an engine failure, a bleed air system failure, an ice condition, and activation of an anti-icing system.

20. The control system of claim 19, wherein the trigger variables further comprise at least one signal indicative of flow of the ambient air, flow of the bleed air, pressure at the ambient air inlet, pressure at the ambient air outlet, pressure at the bleed air inlet, pressure at the bleed air outlet, outside air temperature, temperature at the air inlet, temperature at the air outlet, temperature at the bleed air inlet, temperature at the bleed air outlet, differential pressure between the ambient air inlet and the ambient air outlet, differential pressure between the bleed air inlet and the bleed air outlet, weight on wheel off, altitude of the aircraft, and time.

* * * * *